(12) United States Patent  
Kamioka

(10) Patent No.: US 8,242,934 B2
(45) Date of Patent: Aug. 14, 2012

(54) LIGHT SOURCE DISCRIMINATING APPARATUS, A LIGHT SOURCE DISCRIMINATING PROGRAM, A VEHICLES DETECTION APPARATUS, AND A LIGHT CONTROL APPARATUS

(75) Inventor: Takahiro Kamioka, Kariya (JP)

(73) Assignee: Denso Corporation, Kariya (JP)

( * ) Notice: Subject to any disclaimer, the term of this patent is extended or adjusted under 35 U.S.C. 154(b) by 530 days.

(21) Appl. No.: 12/589,107

(22) Filed: Oct. 16, 2009

(65) Prior Publication Data

US 2010/0102990 A1 Apr. 29, 2010

(30) Foreign Application Priority Data

Oct. 17, 2008 (JP) .................................. 2008-268763

(51) Int. Cl.
G08G 1/04 (2006.01)
(52) U.S. Cl. ........ 340/942; 340/933; 340/937; 340/458; 340/459; 362/460; 362/464; 362/465; 362/466; 315/76
(58) Field of Classification Search .................. 340/458, 340/459, 648, 649, 933, 937, 939, 942, 901, 340/903; 315/76–83; 362/460, 464, 465, 362/466, 512
See application file for complete search history.

(56) References Cited

U.S. PATENT DOCUMENTS

| 6,396,397 B1 * | 5/2002 | Bos et al. ........................ 340/461 |
| 2002/0135468 A1 * | 9/2002 | Bos et al. ........................ 340/436 |
| 2004/0021853 A1 | 2/2004 | Stam et al. |
| 2004/0143380 A1 | 7/2004 | Stam et al. |
| 2004/0164228 A1 | 8/2004 | Fogg et al. |
| 2004/0201483 A1 | 10/2004 | Stam et al. |
| 2004/0230358 A1 | 11/2004 | Stam et al. |
| 2005/0007579 A1 | 1/2005 | Stam et al. |
| 2005/0036660 A1 | 2/2005 | Otsuka et al. |
| 2005/0041313 A1 | 2/2005 | Stam et al. |
| 2007/0023660 A1 | 2/2007 | Seger et al. |
| 2007/0211482 A1 * | 9/2007 | Rebut ............................ 362/466 |
| 2008/0128599 A1 | 6/2008 | Stam et al. |
| 2008/0278577 A1 | 11/2008 | Otsuka et al. |
| 2009/0256938 A1 * | 10/2009 | Bechtel et al. ................. 348/302 |

FOREIGN PATENT DOCUMENTS

| JP | 08-166221 | 6/1996 |
| JP | 2001-076268 | 3/2001 |
| JP | 2005-092857 | 4/2005 |
| JP | 2005-092861 | 4/2005 |
| JP | 2005-534903 | 11/2005 |
| JP | 2006-511383 | 4/2006 |

(Continued)

*Primary Examiner* — Daryl Pope

(74) *Attorney, Agent, or Firm* — Harness, Dickey & Pierce, PLC

(57) ABSTRACT

A light control system identifies in the processing that discriminates light sources in the acquired image as either luminous objects or reflective objects, each pixel obtained that constitutes the acquired image being classified into a plurality of groups according to the brightness of each pixel, and generates a histogram showing the relation of the brightness and the number of pixels of each group that are matched with each group. Then, when the number of pixels corresponding to the brightest group is less than the number of pixels corresponding to the other groups, the existence of the luminous object in the acquired image is determined, and when the number of pixels corresponding to the brighter group is more than the number of pixels corresponding to the other groups, the existence of the reflective object in the acquired image is determined.

8 Claims, 10 Drawing Sheets

FOREIGN PATENT DOCUMENTS

| | | |
|---|---|---|
| JP | 2006-515130 | 5/2006 |
| JP | 2006-521043 | 9/2006 |
| JP | 2007-076428 | 3/2007 |
| JP | 2007-076429 | 3/2007 |
| JP | 2007-238090 | 9/2007 |
| JP | 2008-068700 | 3/2008 |
| JP | 2008-094249 | 4/2008 |

* cited by examiner

LIGHT SOURCE DISCRIMINATING APPARATUS, A LIGHT SOURCE DISCRIMINATING PROGRAM, A VEHICLES DETECTION APPARATUS, AND A LIGHT CONTROL APPARATUS

CROSS-REFERENCE TO RELATED APPLICATION

This application is based on and claims the benefit of priority from earlier Japanese Patent Application No. 2008-268763 filed Oct. 17, 2008, the description of which is incorporated herein by reference.

BACKGROUND OF THE INVENTION

1. Technical Field of the Invention

The present application relates to a light source discriminating apparatus that recognizes light sources detected during the hours of darkness, and to a light source discriminating program, a vehicle detection apparatus and a light control apparatus.

2. Related Art

There are known a vehicle detection apparatuses which can detect that light sources from vehicles during the hours of darkness. A type of such a vehicle detection apparatus analyzes the absolute value of the brightness of a light source. Another type of such a vehicle detection apparatus analyzes the wavelength of the light emitted from a light source. Both of these types of vehicle detection apparatus can discriminate light originating from the luminous object such as headlights of a vehicle, from light originating from a reflective object other than vehicles. For example, such vehicle detection apparatuses are disclosed in Japanese Patent Application Laid-Open Publication Nos. 2005-092857 and 2005-534903.

However, in a vehicle detection apparatus utilizing the absolute value of the brightness of a light source, the brightness of the headlights of a vehicle may coincide with the brightness of light originating from reflective objects, such as a sign, that reflect light. Thus, this type of detection apparatus has suffered from a problem that, if such coincidence occurs, a detection error may be caused, that is, light originating from an object other than vehicles may be determined as being originated from a vehicle.

Further, coincidence may also occur in a vehicle detection apparatus utilizing the wavelength of the light emitted from a light source, when it discriminates whether or not the light source is originated from a vehicle. Specifically, in such a vehicle detection apparatus, the wavelength of the reflection of the light emitted from the headlights of a vehicle may coincide with the wavelength of the light received directly from the headlights. Thus, this type of vehicle detection apparatus has also suffered from a problem of detection errors when such a coincidence occurs.

SUMMARY OF THE INVENTION

In light of the problems mentioned above, the present invention has an object of providing a technique that enables accurate detection of and discrimination between luminous objects and reflective objects during the hours of darkness.

In a light source discriminating apparatus according to a first aspect, the light source discriminating apparatus that discriminates between luminous objects and reflective objects is comprised of an acquisition means to acquire an image, a frequency distribution generation means that groups pixels into one of a plurality of groups according to the brightness of each pixel from the acquired image, and generates a frequency distribution showing a relation between the brightness of each group and the number of pixels in each group, a selection means that selects the brightness and number of pixels of each group from the plurality of groups in the frequency distribution, and a discrimination determining means that determines whether there is any tendency for the number of pixels to decrease as the brightness increases in the frequency distribution for each group that the selection means selected, an existence of the luminous object is determined when the tendency is found, and an existence of the reflective object is determined when the tendency is not found.

That is, when the frequency distribution is generated, the distributions become different between the luminous object that emits light by itself and the reflective object that does not emit light by itself but reflects the light from other objects.

For example, when each group is arranged in order of increasing brightness, and when a graph is produced from the image of number of pixels against grouped brightness, there is a clear difference in form between the case of the luminous object and in the case of the reflective object.

Therefore, in order to detect the difference in the form (difference in distribution), the brightness and the number of pixels of each group in a plurality of groups are respectively selected, and whether there is any tendency that the number of pixels decreases as the brightness increases in the frequency distribution is determined in the present invention.

It should be appreciated that a term "brightness of each pixel" in the present invention may correspond to luminosity, illumination, etc., and a term "grouped brightness" may be the average, maximum, mean, minimum etc. of the brightness for the group.

According to the light source discriminating apparatus mentioned above, since the type of the luminous object included in the acquired image and the reflective object can be obtained based on the frequency distribution, the luminous object and the reflective object are discriminable with sufficient accuracy.

In a light source discriminating apparatus according to a second aspect, the selection means determines that if a gradient showing the difference of the number of pixels within each group to the difference of the brightness in each group is less than a predetermined brightness gradient threshold, existence of the luminous object in the acquired image is determined, and when the gradient is more than the brightness gradient threshold, existence of the reflective object existing in the acquired image is established in each selected group.

In a light source discriminating apparatus according to a third aspect, wherein, in the selection means, one or a plurality of groups (a 1st group) where the pixel that has the brightness more than a 1st threshold and one or a plurality of groups (a 2nd group) where the pixel that has the brightness more than a 2nd threshold, which is less than the 1st threshold, are selected from the frequency distribution, whether the luminous object or the reflective object exists in the acquired image is determined by comparing the area ratio showing the ratio of the number of pixels of the 2nd group to the number of pixels of the 1st group with an area ratio threshold.

In a light source discriminating apparatus according to a fourth aspect, wherein, in the selection means, the 1st threshold is configured to a value acquired by multiplying the brightest pixel by a 1st coefficient that is greater than 0 and less than 1, which is the brightness of the brightest pixel or the brightness of the brightest group of a pixel, and the 2nd threshold is configured to a value acquired by multiplying the brightest pixel by a 2nd coefficient that is greater than 0 and less than the 1st coefficient, the 1st group and the 2nd group are selected according to the 1st and 2nd thresholds, respectively, in the frequency distribution.

In a light source discriminating apparatus according to a fifth aspect, wherein, there is provided a light source detection means to detect a light source in the acquired image, the frequency distribution generation means, the selection means, and the discrimination determining means perform each process for every light source detected by the light source detection means.

In a light source discriminating apparatus according to a sixth aspect, there is provided a light source discriminating program for performing the function in a computer as each means to constitute the light source discriminating apparatus.

In a light source discriminating apparatus according to a seventh aspect, there is provided a vehicle detection apparatus that detects vehicles which comprises a light source discriminating means that identifies whether a light source in an acquired image is a luminous object or a reflective object, a characteristic determining means that determines whether the light source in the acquired image has a characteristics of the vehicle, and a detection determining means determines that a vehicle is detected when the light source is decided to be a luminous object by the light source discriminating means and the light source has the characteristics of a vehicle as determined by the characteristic determining means, wherein, the light source discriminating means constitutes a light source discriminating apparatus.

In a light source discriminating apparatus according to an eighth aspect, there is provided a light source control apparatus equipped in vehicles that controls an illumination range of headlights in the vehicles comprises a vehicle detection means that detects the vehicles in an acquired image, and a changing means that dips the headlights only when vehicles are detected by the vehicle detection means, wherein, the vehicle detection means constitutes a vehicle detection apparatus.

DETAILED DESCRIPTION OF THE PREFERRED EMBODIMENTS

With reference to the accompanying drawings, hereinafter will be described an embodiment of the present invention.

Configuration of the Present Embodiment

Figure 1:
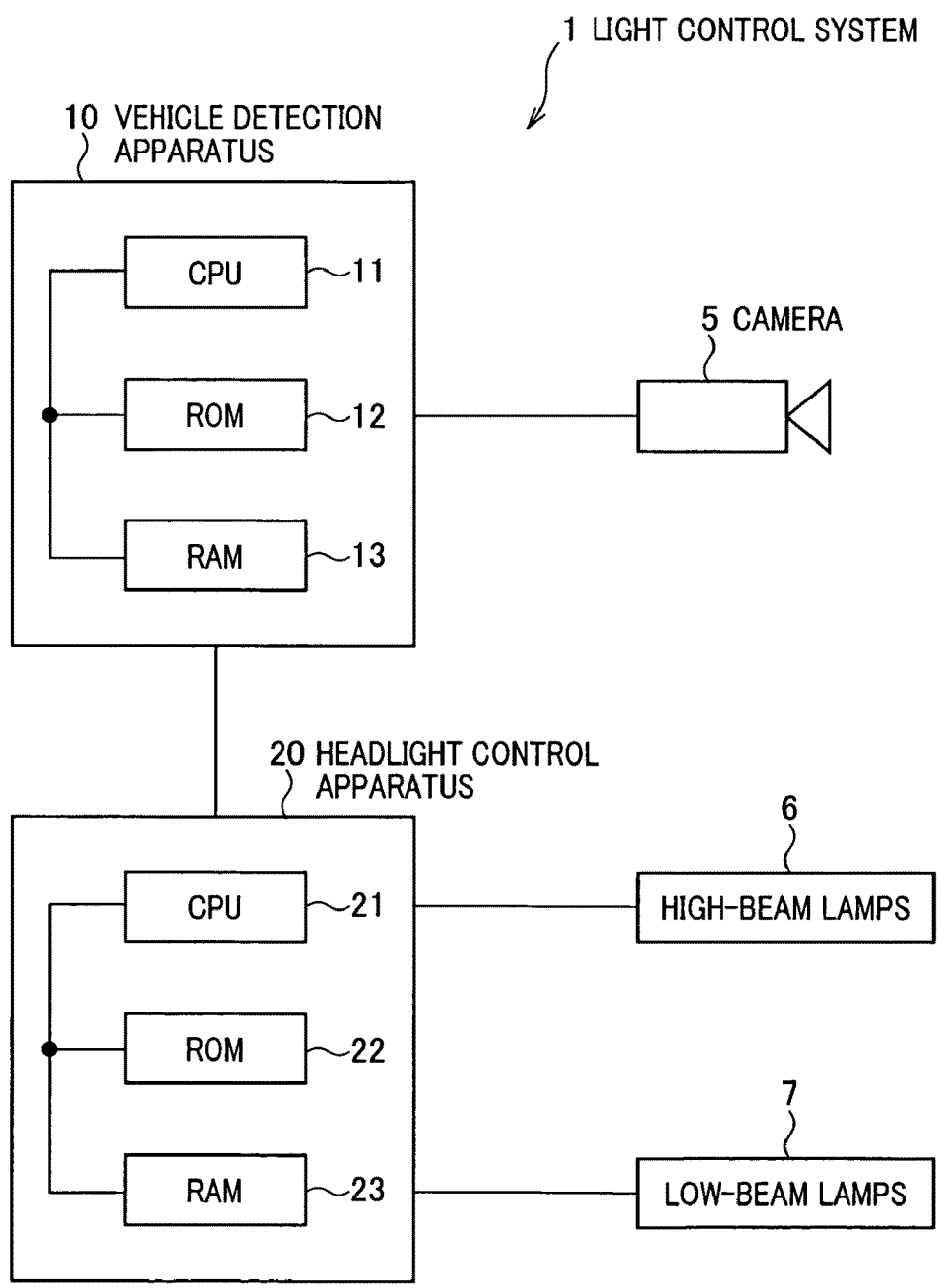
FIG. 1 shows a schematic block diagram illustrating a light control system in which the present invention is applied.

FIG. 1 is a schematic block diagram illustrating a light control system (light control apparatus) 1 to which the present invention is applied. The light control system 1 is equipped on a vehicle, such as a passenger car, (hereinafter referred to as "the vehicle"). The light control system 1 has a function of controlling the illumination range of the headlights of the vehicle.

As shown in FIG. 1, the light control system 1 includes a camera 5, a vehicle detection apparatus 10 (light source discriminating apparatus) and a headlight control apparatus 20. The camera 5 picks up images of the road frontward of the vehicle. The vehicle detection apparatus 10 detects another, vehicle from the images picked up by the camera 5. The headlight control apparatus 20 operates ("switches ON/OFF" in the present embodiment) high-beam lamps 6 and low-beam lamps 7.

The high-beam lamps 6 are the lamps (high beams) used when the vehicle travels on a road and have an illumination range of up to about 100 m forward of the vehicle. The low-beam lamps 7 are the lamps (low beams) used when the vehicle comes across other vehicles and have an illumination range of up to about 40 m forward of the vehicle.

The vehicle detection apparatus 10 has a configuration that includes a known microcomputer, which is provided with a CPU 11, a ROM 12, a RAM 13, and the like. The CPU 11 executes various processes, such as a light control process that will be described later, based on a program, such as a light source discriminating program, stored in the ROM 12. Also, the vehicle detection apparatus 10 (CPU 11) transmits to the headlight control apparatus 20 a command signal for changing the direction of the optical axis (including a command signal for switching ON/OFF the high-beam lamps 6).

The headlight control apparatus 20 has a configuration that includes a known microcomputer, which is provided with a CPU 21, a ROM 22, a RAM 23, and the like. Upon reception of a command signal from the vehicle detection apparatus 10, the CPU 21 controls the direction of the optical axis of the low-beam lamps 7, or controls switch-ON/OFF of the high-beam lamps 6, based on the program stored in the ROM 22. In other words, the CPU 21 changes the illumination range of the headlights.

In the present embodiment, description is omitted as to the process and the mechanism of controlling the direction of the optical axis of the low-beam lamps 7. The following description is focused on the process of controlling the switch-ON/OFF of the high-beam lamps 6 and the low-beam lamps 7.

Figure 2A:
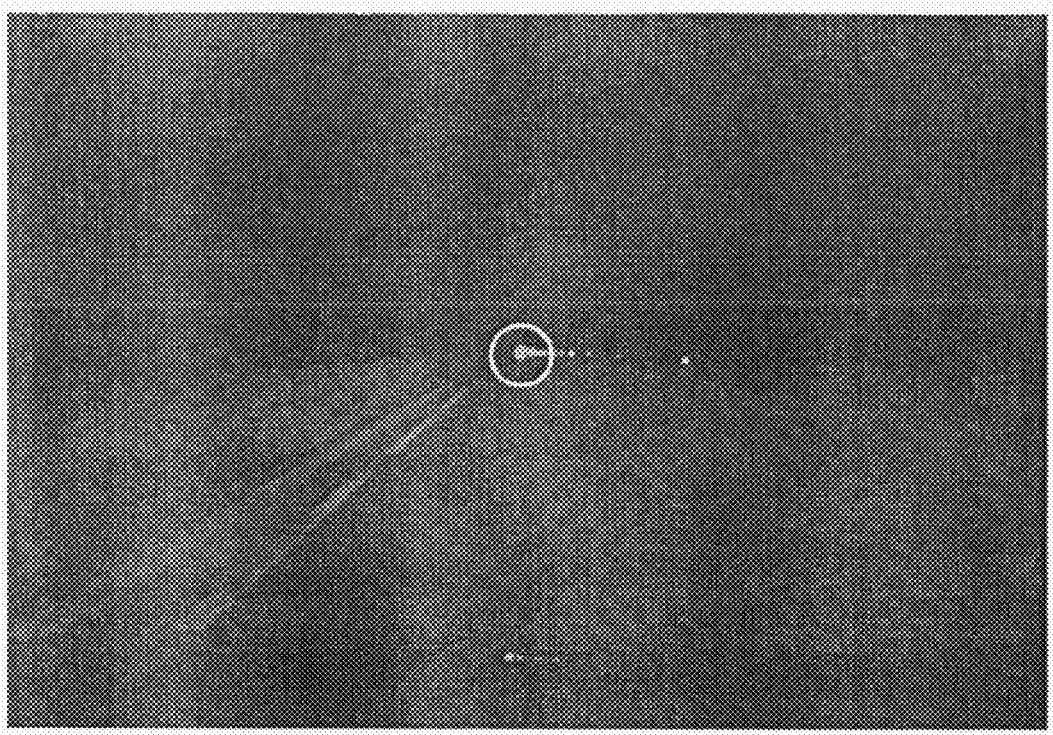
FIG. 2A shows an acquired image when a light source is a luminous object.
Figure 2B:
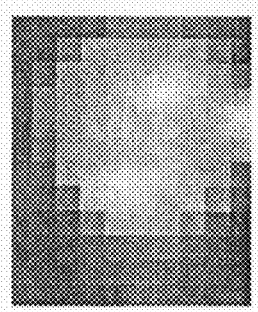
FIG. 2B shows an enlargement of the light source.
Figure 2C:
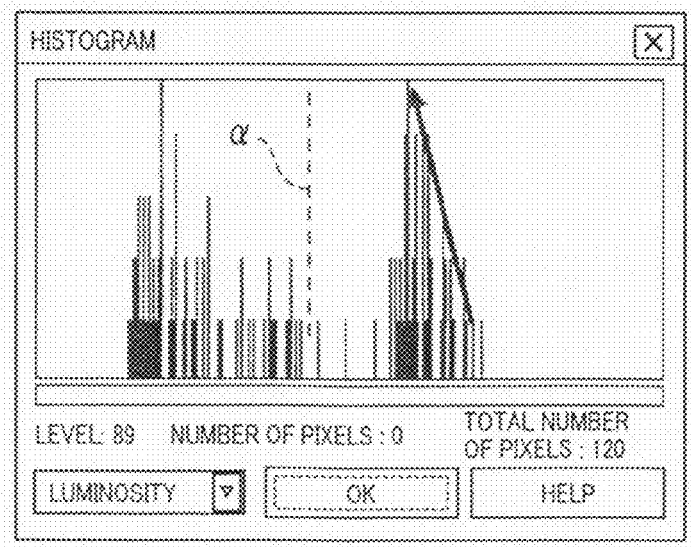
FIG. 2C shows a histogram of the light source.

Here, FIG. 2A is an acquired image when a light source is a luminous object; FIG. 2B is an enlargement of the light source, and FIG. 2C is a histogram of the light source.

Figure 3A:
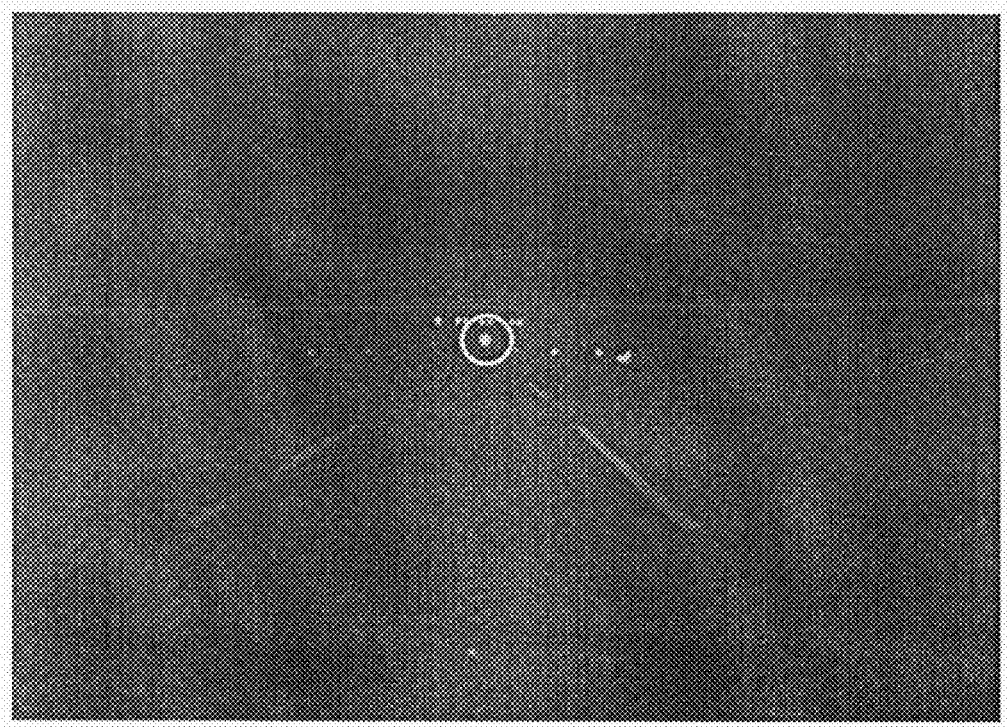
FIG. 3A shows an acquired image when the light source is a reflective object.
Figure 3B:
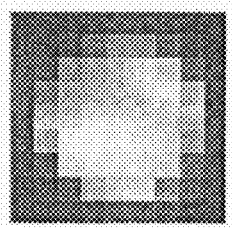
FIG. 3B shows an enlargement of the light source.
Figure 3C:
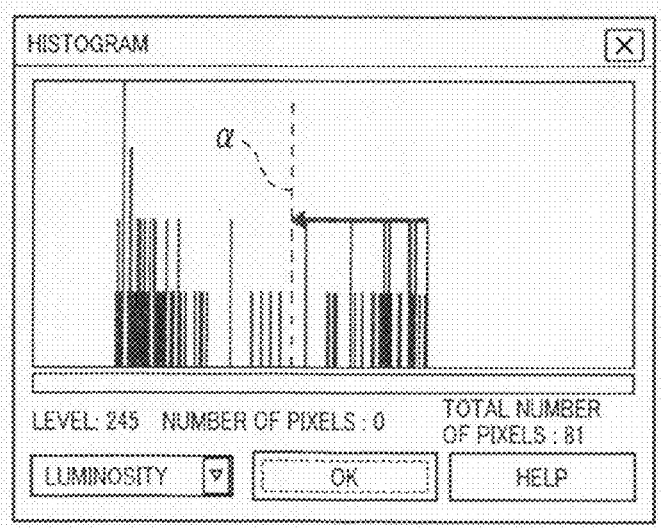
FIG. 3C shows a histogram of the light source.

Further, FIG. 3A is an acquired image when the light source is a reflective object; FIG. 3B is an enlargement of the light source, and FIG. 3C is a histogram of the light source.

Figure 4A:
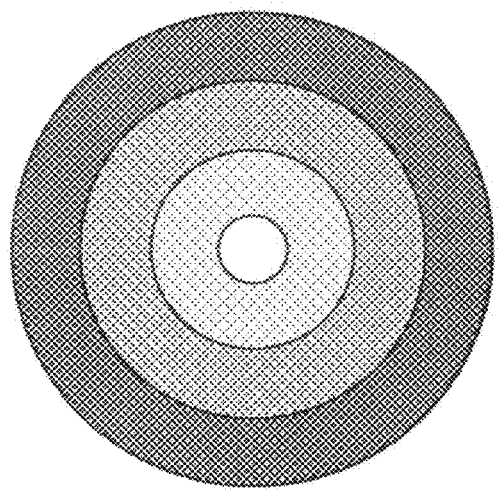
FIG. 4A is a typical diagram showing distribution of brightness when the light source is the luminous object.
Figure 4B:
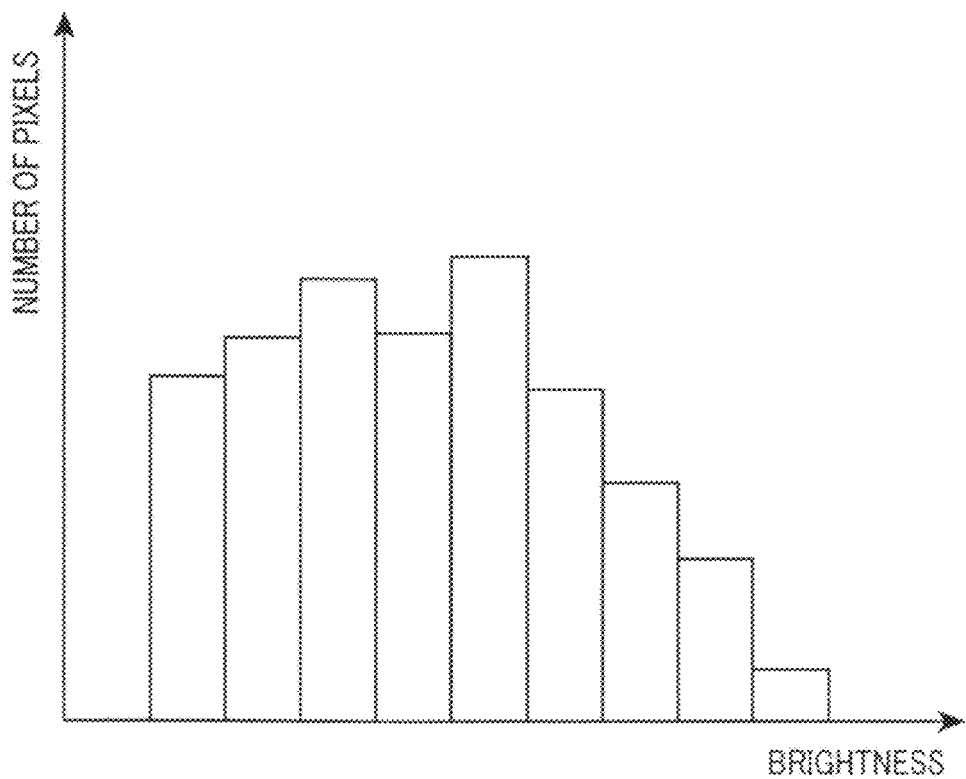
FIG. 4B is a typical histogram when the light source is the luminous object (less than a threshold a is excluded)

Furthermore, FIG. 4A is a typical diagram showing distribution of brightness when the light source is the luminous object, and FIG. 4B is a typical histogram when the light source is the luminous object (less than a threshold α is excluded).

Figure 5A:
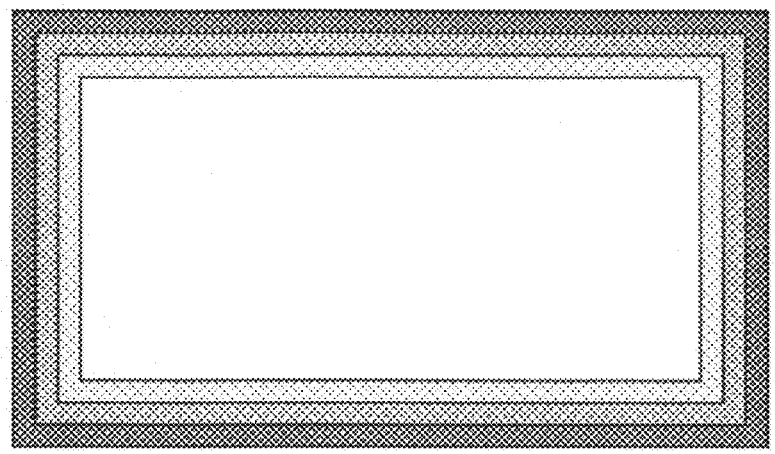
FIG. 5A is a typical diagram showing distribution of brightness when the light source is the reflective object.
Figure 5B:
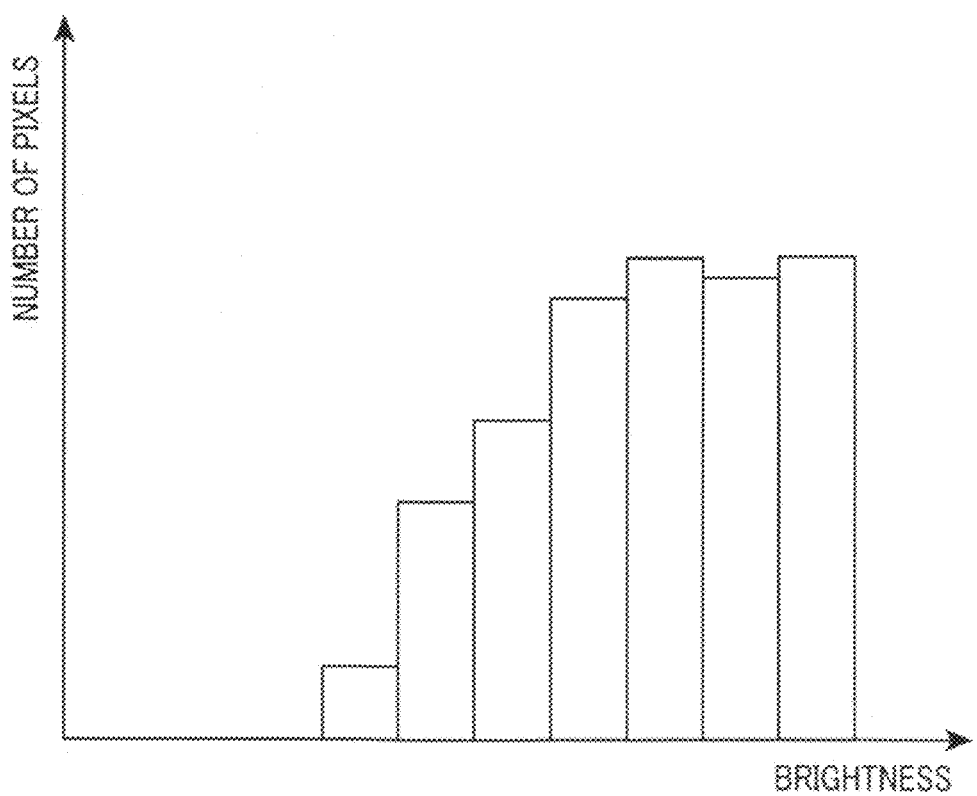
FIG. 5B is a typical histogram when the light source is the reflective object (less than a threshold a is excluded)

Moreover, FIG. 5A is a typical diagram showing distribution of brightness when the light source is the reflective object, and FIG. 5B is a typical histogram when the light source is the reflective object (less than a threshold αis excluded).

The phrase "luminous object" means that the light source emits light itself (e.g. streetlights and headlights), and the phrase "reflective object" means that the light source does not emit light itself (e.g. reflectors and road signs).

The histogram classifies each pixel contained within acquired image to one of a plurality of groups (a sufficient number of groups that a set of pixels whose light source have a plurality of brightness, and a plurality of pixels can be distributed to most groups: about 20-50 defined group) according to the brightness (here, luminosity), and is constituted as frequency distribution showing the relation of the brightness and the number of pixels of each group which were matched with each group.

In this histogram, the range of the brightness of the pixel that are distributed for every group is configured by dividing the range of the brightness that can be spectrum with the camera 5 by a number of groups into equal intervals. In addition, the middle brightness of the ranges of the brightness configured in each group is configured as the brightness of each group.

It should be appreciated that the brightness of each group may be an average value of the brightness of each pixel classified into each group, or may be the maximum value or the minimum value of the brightness of the pixel classified into each group.

As shown in FIGS. 2A and 3A, there is no big difference found by only viewing the acquired image when the light source is either the luminous object or the reflective object. However, according to the histograms shown in FIGS. 2C and 3C, differences can be clearly seen in the distribution of the number of pixels according to the brightness.

In the histograms (FIGS. 2C and 3C), the threshold α for determining that it is the domain of the light source is shown. Regarding the group classified as having brightness less than this threshold α will be ignored when distribution of the number of pixels is considered.

The histogram shown in FIG. 4A is obtained when the light source is a luminous object that is a point light source like a headlight. The light source has a brightest spot in a center of the acquired image and the light spreads while darkening gradually outward. When the light source is a reflective object like a road sign, as shown in FIG. 5A, the whole reflective surface has a fixed luminosity that is a brightest domain in an acquired image and the light spreads only slightly while darkening gradually outward. However, when the light source is a reflective object, the domain (domain gets wider at darker levels more gradually) is quite narrower than the domain of the luminous object.

For this reason, in the histograms of the luminous object, (FIGS. 2C and 4B), the number of pixels of each group decreases as the brightness of the group increases (as it moves to the right of the graph).

On the other hand, in the histograms of the reflective object, (FIGS. 3C and 5B), the number of pixels of each group increases as the brightness for the group increases, and the number of pixels is a maximum for the brightest group.

[Processing of the Present Embodiment]

In the light control processing shown below, the differences in the above histograms are detected. Vehicle light sources (headlights) and other light sources other than vehicles are identified using the above detection result, and the processing that changes the illumination range by the headlights based on the discriminating result is further performed.

Figure 6:
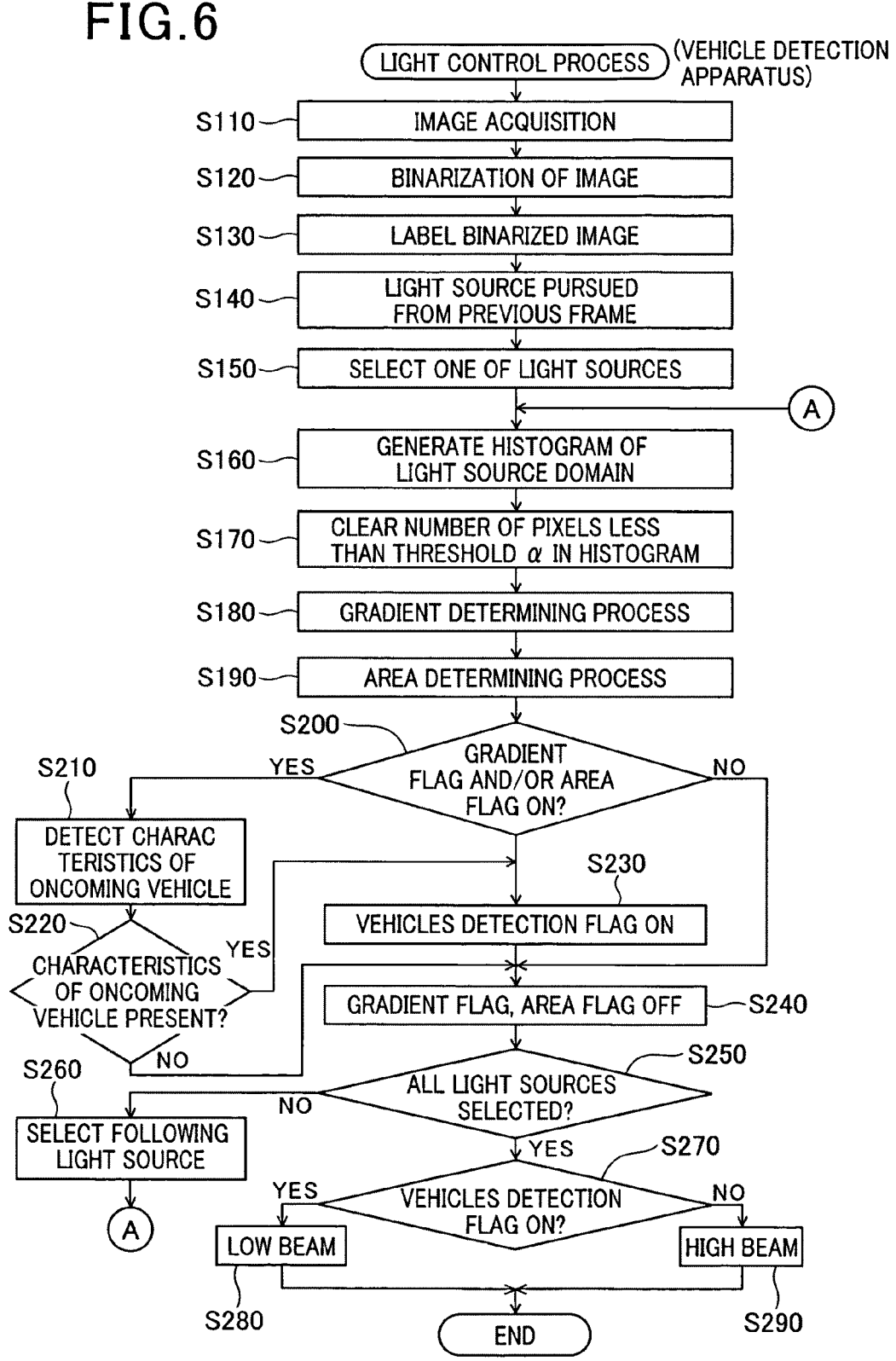
FIG. 6 shows a flow chart of a light control processing.

FIG. 6 is a flow chart that shows the light control processing which the vehicle detection apparatus 10 performs.

In light control processing of the present embodiment, the process at S110 corresponds to an acquisition means as used in the field of this invention, processes at S120 and S130 correspond to a light source detection means, and process at S160 corresponds to a frequency distribution generation means of the present invention.

In addition, processes at S180-S200 correspond to a light source discriminating means, the process at S210 corresponds to a characteristic determining means, and processes at S220 and S230 correspond to a detection determining means of the present invention.

Further, processes at S420, S520, and S530 correspond to a selection means, and processes at S200, S470, S480, S580, and S590 correspond to a discrimination determining means.

Furthermore, processes of S110-S260 correspond to a vehicle detection means, and processes of S270-S290 correspond to a changing means of the present invention.

The light control process is a process started with the switch-ON of the power source, such as an ignition switch, not shown, of a vehicle, and activated thereafter at every periodic image acquisition time (e.g., every $\frac{1}{30}$ sec.) of the camera 5.

It should be appreciated that an gradient flag, an area flag, and a vehicle detection flag, which will be described later, are to be cleared (in OFF state) at the start of the light control process. Specifically, in the light control process, an image picked up by the camera 5 is acquired first as shown in FIG. 6 (S110).

Then, binarization is performed in the acquired image using a brightness that serves as a reference brightness (S120), followed by extracting light sources, i.e. those regions which have brightness equal to or more than the reference brightness, and labeling the individual light sources (S130). The "reference brightness" here refers to a threshold that distinguishes a dark region from other regions than the dark region. When the domain of the light source is extracted, the rectangular domain (refer to FIGS. 2B and 3B) that the domain of the light source fits will be cut out.

Then, the extracted light sources are correlated with the respective light sources extracted in the previous and the preceding image pickup performances (previous frames) (S140). This process is performed in order to enable keeping track of the brightness, the area, or the like, of each of the light sources.

Then, one of the extracted light sources is selected (S150), and the histogram of the selected light source (refer to FIGS. 2C and 3C) is generated (S160). Next, groups having brightness less than the threshold α (data of the brightness less than the threshold α) are cleared (S170).

Here, since the domain that is not a light source (domain of darkness) is also included in the rectangular domain when the rectangular domain that the domain of the light source fits is cut out in the process of S130, the process of S170 is needed in order to exclude the domain that is not the light source. Then, gradient determining process (S180) and area determining process (S190) are performed in order.

Figure 7:
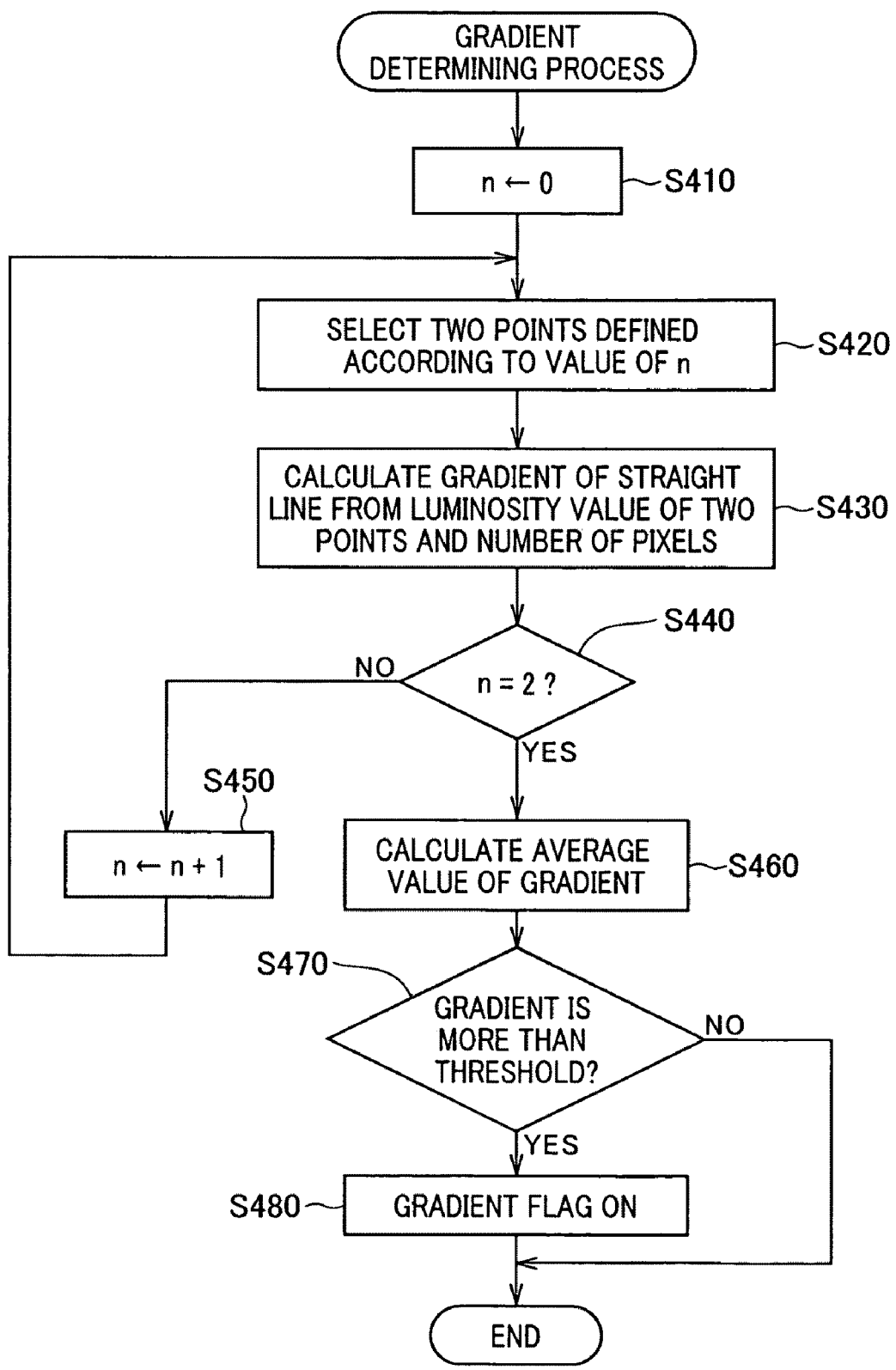
FIG. 7 shows a flow chart of an gradient determining process.

The gradient determining process is explained using the flow chart shown in FIG. 7. In the gradient determining process, the variable n that expresses the number of times the process has been repeated is initialized to 0 (S410).

Then, in the histogram, two groups beforehand defined according to the value of n are chosen (S420). In this process, a pair of the optimal group for identifying the luminous object and the reflective object is chosen according to the value of n.

For example, a group having the brightest pixel being classified in the luminous object (hereafter called the "brightest group") and a group having the most pixels (hereafter called the "most frequent group") are selected as a 1st pair at the time of n=0. The brightest group and a group having 60% of the brightness of the brightest group (hereafter called "the 60% group") are selected as a 2nd pair at the time of n=1. The 60% group and a group having 90% of the brightness of the brightest group (hereafter called "the 90% group") are selected as a 3rd pair at the time of n=2.

Here, the reason for selecting the brightest group and the most frequent group as the 1st pair is that when the light source is the luminous object, as shown in FIGS. 2C and 4B, there are fewer pixels in the brightest group, and when the light source is the reflective object, as shown in FIGS. 3C and 5B, the number of pixels of the brightest group has as many pixels as of the most frequent group. Therefore, when choosing these two groups, the difference of the distribution in the histogram may be effectively detectable.

Also, the reason for selecting the brightest group and the 60% group as the 2nd pair, or selecting the 60% group and the 90% group as the 3rd pair is that since the difference of the distribution is remarkable at 50% or more of the brightness of the brightest group in the histogram, the difference of distribution on different conditions can be detected even if the difference of distribution is undetectable in the 1st pair by chance.

Then, the gradient that is the difference of the number of pixels of each group to the difference of each brightness in the selected group is calculated (S430), and whether n=2 is determined (S440). If not n=2 (S440: NO), the n will be increased by 1 (S450), and processes S420 and hereafter will be repeated.

If n=2 (S440: YES), the average value of each gradient obtained by processing S430 three times will be calculated (S460), and it will be determined whether the average value of the gradient is more than the threshold (S470).

Since the threshold is for identifying the luminous object and the reflective object, the threshold here should just be configured so that its gradient lies between arrows (arrow for the luminous object and arrow for the reflective object) shown on the above-mentioned histogram. It should be appreciated that the specific numerical value of the threshold should be calculated experimentally that the value could identify the luminous object and the reflective object well.

When the histogram gradient is more than the threshold (S470: YES), the light source is treated as a luminous object and a gradient flag is set to ON (S480), and ends the gradient determining process. When the gradient is less than the threshold (S470: NO), the light source is treated as a reflective object, and the gradient determining process is ended immediately.

Figure 8:
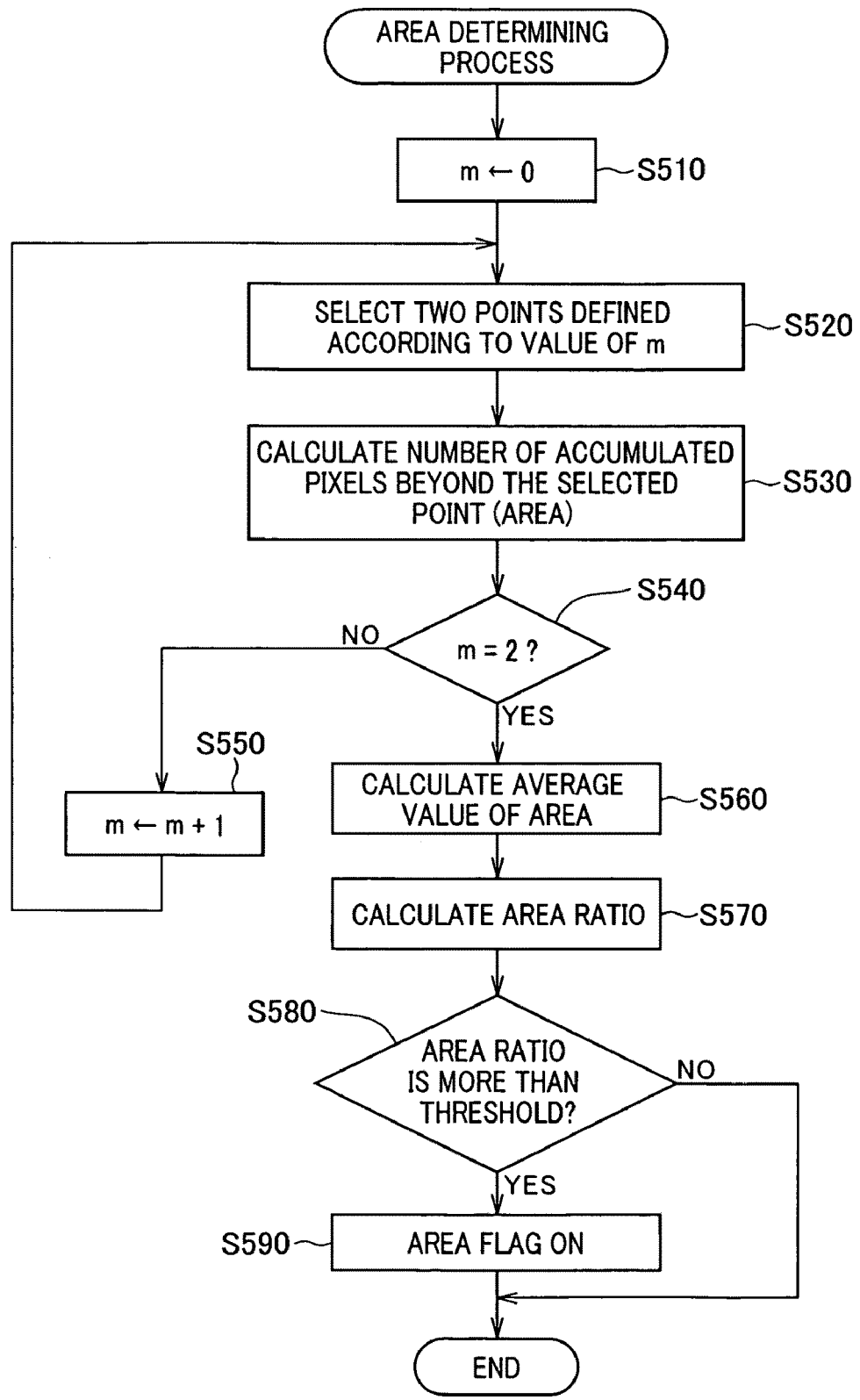
FIG. 8 shows a flow chart of an area determining process.

Next, the area determining process is explained using the flow chart shown in FIG. 8. In the area determining process, the variable m that expresses the number of times the process has been repeated is initialized to 0 (S510).

Then, in the histogram, two groups beforehand defined according to the current value of m are chosen (S520). In this process, the same process as S420 is performed. Then, all the groups brighter than the selected group (the groups on the right of the group selected in the histogram) are chosen, and these numbers of accumulation pixels (that is, the area more than the brightness of the selected group) are calculated (S530) for each group.

Next, whether m=2 is determined (S540). If m does not equal 2 (S540: NO), m will be increased by 1 (S550), and processes of S520 and hereafter will be repeated. If m=2 (S540: YES), the average value of each area obtained by processing S530 three times will be calculated (S560), and a ratio of each area calculated by the process S530 will be calculated (S570).

The area corresponding to the brightest group of the groups selected is a denominator here, and the area corresponding to other groups is a numerator. When the numerator and the denominator are replaced, it is necessary to change the threshold used in S580 (mentioned later) to the reciprocal, and the process of S590 must be performed if it is determined negatively in the process S580.

Figure 9A:
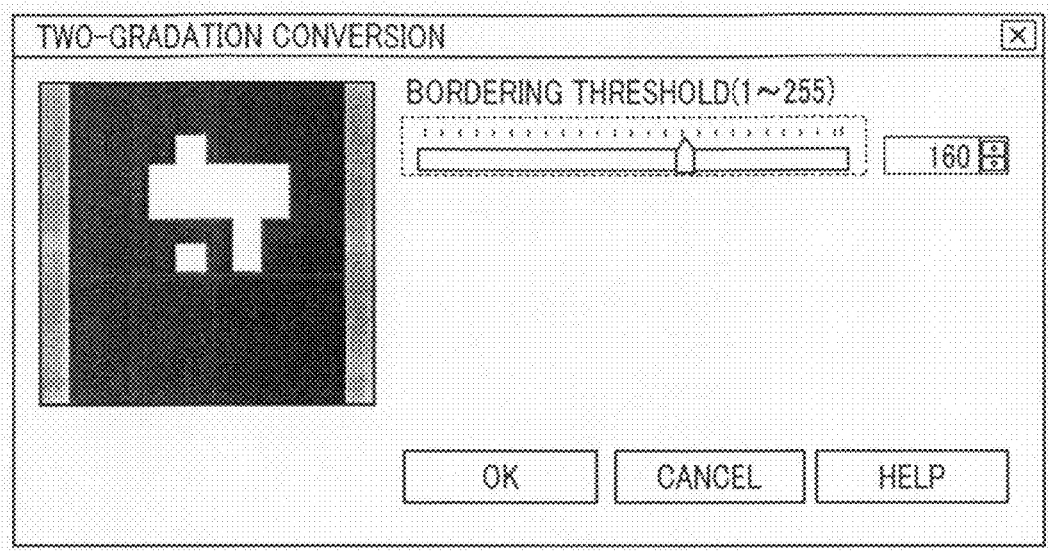
FIGS. 9A and 9B are diagrams showing distribution of pixels selected when the light source is the luminous object.
Figure 9B:
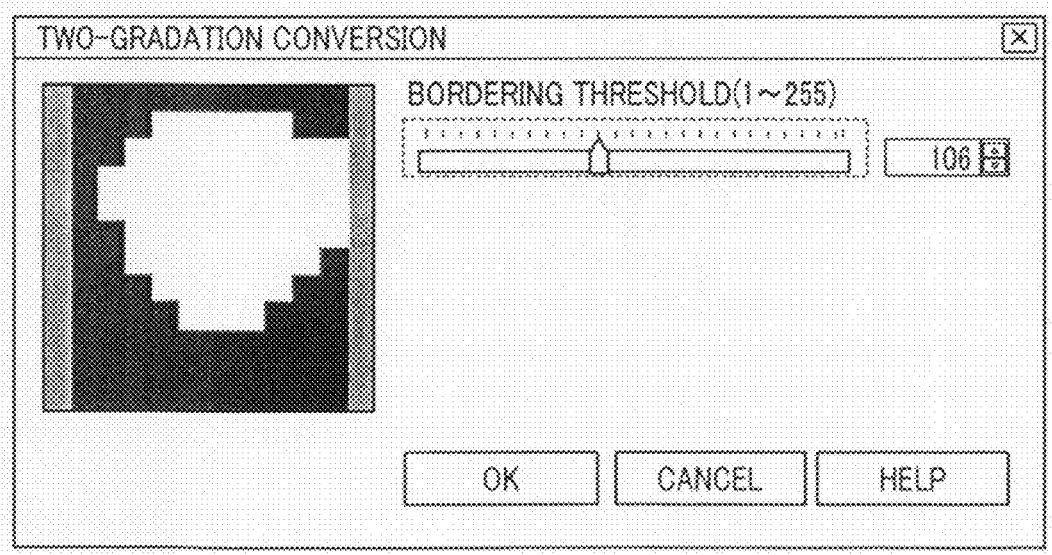
Figure 10A:
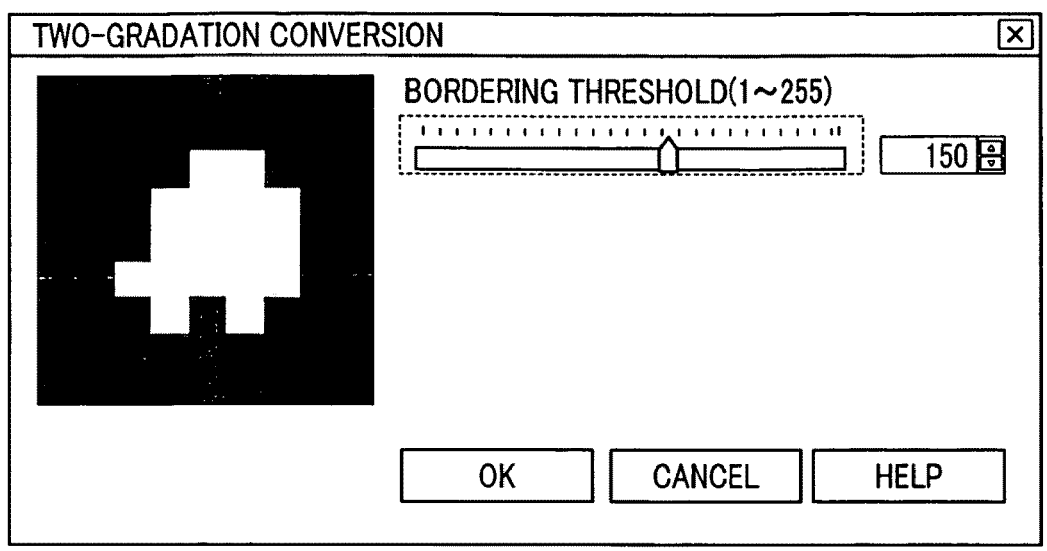
FIGS. 10A and 10B are diagrams showing distribution of pixels selected when the light source is the reflective object.
Figure 10B:
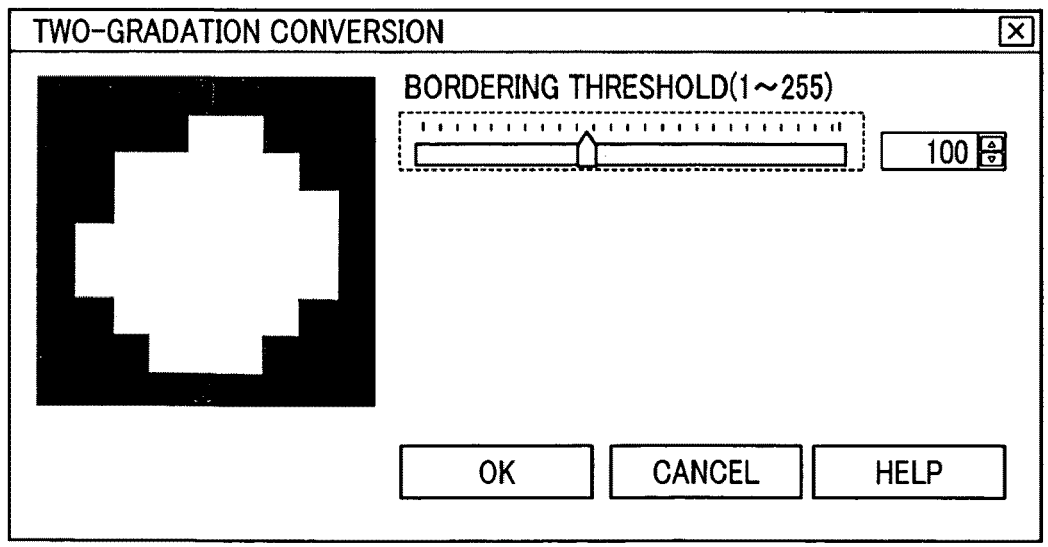

FIGS. 9A and 9B are diagrams showing distribution of pixels selected when the light source is the luminous object, and FIGS. 10A and 10B are diagrams showing distribution of pixels selected when the light source is the reflective object.

FIGS. 9A and 10A show the domains which include pixels having brightness 90% of the brightest pixel extracted (hereafter called "the 90% domain") while FIGS. 9B and 10B show the domains which include pixels having brightness 60% of the brightest pixel extracted (hereafter called "the 60% domain").

As shown in FIGS. 9A, 9B, 10A and 10B, when the light source is the luminous object, it turns out that the ratio of the area of 90% domain to the area of 60% domain becomes small as compared with the case where the light source is the reflective object. Specifically, when the light source is the luminous object, the area ratio is about 3.9, and when the light source is the reflective object, the area ratio is about 1.7.

Next, whether an area ratio is more than the threshold is determined (S580).

Since the threshold is for identifying the luminous object and the reflective object, the threshold here should just be configured so that its value lies between the area ratio when the light source is the luminous object and the area ratio when the light source is the reflective object. It should be appreciated that the specific numerical value of the threshold should be calculated experimentally such that the value can identify the luminous object and the reflective object reliably.

When the area ratio is more than the threshold (S580: YES), the light source is treated as a luminous object and an area flag is set to ON (S590), and ends the area determining process. When the area ratio is less than the threshold (S580: NO), the light source is treated as a reflective object, and ends the area determining process immediately.

After area determining process is completed, the process returns to FIG. 6 and whether both the gradient flag and the area flag are set to ON (S200). When both flags are ON (S200: YES), characteristics of an oncoming vehicle as the light source will be detected (S210).

The specific characteristics of the oncoming vehicle are that a pair of light source is detected, that the position where the light source is detected is a suitable position, that the wavelength of the light source is typical for the headlights of the vehicles, etc. Anything that satisfies any of the above characteristics is determined as the vehicle. It should be appreciated that common technology may be used to process the detection of the characteristics of the oncoming vehicle.

Then, whether the light source has the characteristics of the oncoming vehicle is determined (S220). If it has the characteristics of an oncoming vehicle (S220: YES), it is treated such that a vehicle has been detected from the acquired image, a vehicles detection flag will be set to ON (S230), and processing will shift to the process S240.

When the gradient flag or the area flag is OFF at the process S200 (S200: NO), or the characteristics of an oncoming vehicle is not present at the process S220 (S220: NO), it is treated such that no vehicle is detected from the acquired image, processing is shifted to the process S240 immediately, and the gradient flag and the area flag are configured to OFF (S240).

Next, whether all the light sources have been selected is determined (S250). If any of the light sources is not selected (S250: NO), the following light source is selected (S260) and processes S160 and hereafter will be repeated.

If all light sources are selected (S250: YES), whether the vehicles detection flag is configured to ON is determined (S270). If the vehicles detection flag is set to ON (S270: YES), the headlight control apparatus 20 is commanded to switch to a low beam (S280), and the light control processing will be ended.

Then the headlight control apparatus 20 that received the command to switch to the low beam turns on the low-beam lamps and turns off the high-beam lamps.

If the vehicles detection flag is set to OFF (S270: NO), the headlight control apparatus 20 is commanded to switch to a high beam (S290), and the light control processing will be ended. Then the headlight control apparatus 20 that received the command to switch to the high beam turns on the high-beam lamps 6. Under the present circumstances, the low-beam lamps may be turned off, or kept turned on.

[The Effect of the Present Embodiment]

In the light control system 1 explained in full detail as mentioned above, the vehicle detection apparatus 10 identifies whether the light source in the acquired image is a luminous object or a reflective object, and determines whether the light source has the characteristics of a vehicle by the light control processing.

When the vehicle detection apparatus 10 determines that the vehicles are detected when the light source is identified as the luminous object and the light source is determined to have the characteristics of vehicles, it changes the illumination range of the headlights downward.

Especially the vehicle detection apparatus 10 identifies in the processing that the light source in the acquired image is whether the luminous object or the reflective object, each pixel obtained that constitutes the acquired image is classified into a plurality of groups according to the brightness of each pixel, and generates the frequency distribution (histogram) showing the relation of the brightness and the number of pixels of each group.

Further, in the generated frequency distribution, the vehicle detection apparatus 10 selects each brightness and number of pixels of each of the group in a plurality of groups.

Furthermore, the vehicle detection apparatus 10 will determine that the luminous object exists in the acquired image, if the number of pixels corresponding to the brighter group of the selected groups is less than the number of pixels corresponding to other groups, and if the number of pixels corresponding to the brighter group is more than the number of pixels corresponding to other groups, it will determine that the reflective object exists in the acquired image.

Moreover, in the vehicle detection apparatus 10 of the light control system 1, in the gradient determining process, the group that the brightest pixel is classified and the group that the most pixels are classified are selected according to the frequency distribution, and in each selected group, when the gradient showing the difference of the number of pixels of each group to the difference of the brightness in each group is less than a predetermined brightness threshold, it will be determined that the luminous object exists in the acquired image, and when the gradient is more than the brightness threshold, it will be determined that a reflective object exists in the acquired image.

Further, in the vehicle detection apparatus 10 of the light control system 1, in the area determining process, one or a plurality of groups (1st group) that classify the pixel that has the brightness more than the 1st threshold and one or a plurality of groups (2nd group) that classify the pixel that has the brightness more than the 2nd threshold, which is less than 1st threshold, are selected according to the frequency distribution, whether the luminous object or the reflective object exists in the acquired image is determined by comparing the area ratio showing the ratio of the number of pixels of the 2nd group and the number of pixels of the 1st group with the area threshold.

According to such a light control system 1, since the luminous object and the characteristics of the reflective object contained in the acquired image can be obtained based on the frequency distribution, the luminous object and the reflective object are discriminable with sufficient accuracy.

In addition, since the process that identifies whether the light source in the acquired image is the luminous object or the reflective object, and the process that determines whether the light source has the characteristics of vehicles are used together according to such a light control system 1, the detection accuracy of vehicles can be raised.

Moreover, according to such a light control system 1, since the illumination range of the headlights will be changed downward when vehicles are detected, dazzling other vehicles' drivers can be prevented.

Further, in the vehicle detection apparatus 10 of the light control system 1, in the frequency distribution, the 1st threshold is configured to the value acquired by multiplying the 1st coefficient that is greater than 0 and less than 1 by the brightest pixel, which is the brightness of the brightest pixel or the brightness of the brightest group of pixels, and the 2nd coefficient is configured to the value acquired by multiplying the 2nd coefficient that is greater than 0 and less than the 1st coefficient by the brightest pixel, the 1st group and the 2nd group are selected according to each configured threshold.

According to the vehicle detection apparatus 10 mentioned above, since the 1st threshold and the 2nd threshold can be changed according to the brightness of the brightest pixel, the rate of the number of pixels contained in the 1st group and the 2nd group to the whole number of pixels can be made constantly. Therefore, the area ratio is appropriately calculable.

Furthermore, in the light control system 1, the vehicle detection apparatus 10 performs the processes S160-S260 for every detected light source.

According to the above-mentioned vehicle detection apparatus 10, every light source can be determined whether it is the luminous object or the reflective object even if in the case where a plurality of light sources exists in the acquired image.

[Other Embodiments]

The embodiment of the present invention can take various forms, as long as it is not limited to the above-mentioned embodiment at all and belongs to the technical range of the present invention.

For example, although whether the process of S200 sets to both the gradient flag and the area flag ON in the light control processing of the above-mentioned embodiment, determination may be made whether either is set to ON.

Further, although both processing of gradient determining process (S180) and area determining process (S190) are performed in the above-mentioned embodiment, only either one of the processing of S180 and S190 may be performed.

Furthermore, although the process of detecting the gradient and the area is repeated n times or m times while changing the group in the gradient determining process and the area determining process, it may be performed once without repeating.

What is claimed is:

1. A light source discriminating apparatus that discriminates between luminous objects and reflective objects comprising:
    an acquisition unit to acquire an image;
    a frequency distribution generation unit that groups pixels into one of a plurality of groups according to brightness of each pixel from the acquired image, and generates a frequency distribution showing a relation between the brightness of each group and the number of pixels in each group;
    a selection unit that selects the brightness and number of pixels of each group from the plurality of groups in the frequency distribution; and
    a discrimination determining unit that determines whether there is any tendency for the number of pixels to decrease as the brightness increases in the frequency distribution for each group that the selection unit selected, an existence of the luminous object is determined when the tendency is found, and an existence of the reflective object is determined when the tendency is not found.

2. The light source discriminating apparatus according to claim 1, wherein,
    the selection unit selects the group with the brightest pixel and the group with the most pixels in the frequency distribution,
    the selection unit determines that if a gradient showing the difference of the number of pixels within each group to the difference of the brightness in each group is less than a predetermined brightness gradient threshold, existence of the luminous object in the acquired image is determined, and when the gradient is more than the brightness gradient threshold, existence of the reflective object existing in the acquired image is established in each selected group.

3. The light source discriminating apparatus according to claim 1, wherein,
    in the selection unit, one or a plurality of groups (a 1st group) where the pixel that has the brightness more than a 1st threshold and one or a plurality of groups (a 2nd group) where the pixel that has the brightness more than a 2nd threshold, which is less than the 1st threshold, are selected from the frequency distribution,
    whether the luminous object or the reflective object exists in the acquired image is determined by comparing an area ratio showing a ratio of the number of pixels of the 2nd group to the number of pixels of the 1st group with an area ratio threshold.

4. The light source discriminating apparatus according to claim 3, wherein,
    in the selection unit, the 1st threshold is configured to a value acquired by multiplying the brightest pixel by a 1st coefficient that is greater than 0 and less than 1, which is the brightness of the brightest pixel or the brightness of the brightest group of a pixel, and the 2nd threshold is configured to a value acquired by multiplying the brightest pixel by a 2nd coefficient that is greater than 0 and less than the 1st coefficient,
    the 1st group and the 2nd group are selected according to the 1st and 2nd thresholds, respectively, in the frequency distribution.

5. The light source discriminating apparatus according to claim 1, wherein,
    there is provided a light source detection unit to detect a light source in the acquired image,
    the frequency distribution generation unit, the selection unit, and the discrimination determining unit perform each process for every light source detected by the light source detection unit.

6. The light source discriminating apparatus according to claim 1, wherein
    there is provided a light source discriminating program for performing the function in a computer as each unit to constitute the light source discriminating apparatus.

7. A vehicle detection apparatus that detects vehicles comprising:
    a light source discriminating unit that identifies whether a light source in an acquired image is a luminous object or a reflective object;
    a characteristic determining unit that determines whether the light source in the acquired image has a characteristics of the vehicle; and
    a detection determining unit determines that a vehicle is detected when the light source is decided to be a luminous object by the light source discriminating unit and the light source has the characteristics of a vehicle as determined by the characteristic determining unit; wherein,
    the light source discriminating unit constitutes the light source discriminating apparatus according to claim 1.

8. A light source control apparatus according to claim 7 disposed in vehicles that controls an illumination range of headlights in the vehicles comprising:
    a vehicle detection unit that detects the vehicles in an acquired image; and
    a changing unit that dips the headlights only when the vehicles are detected by the vehicle detection unit; wherein,
    the vehicle detection unit constitutes the vehicle detection apparatus.

* * * * *